(No Model.) 6 Sheets—Sheet 1.
J. N. WILSON.
PLANTER.

No. 518,979. Patented May 1, 1894.

Witnesses.
A. H. Opsahl.
Frank D. Merchant.

Inventor.
James N. Wilson
By his Attorney.
Jas. F. Williamson

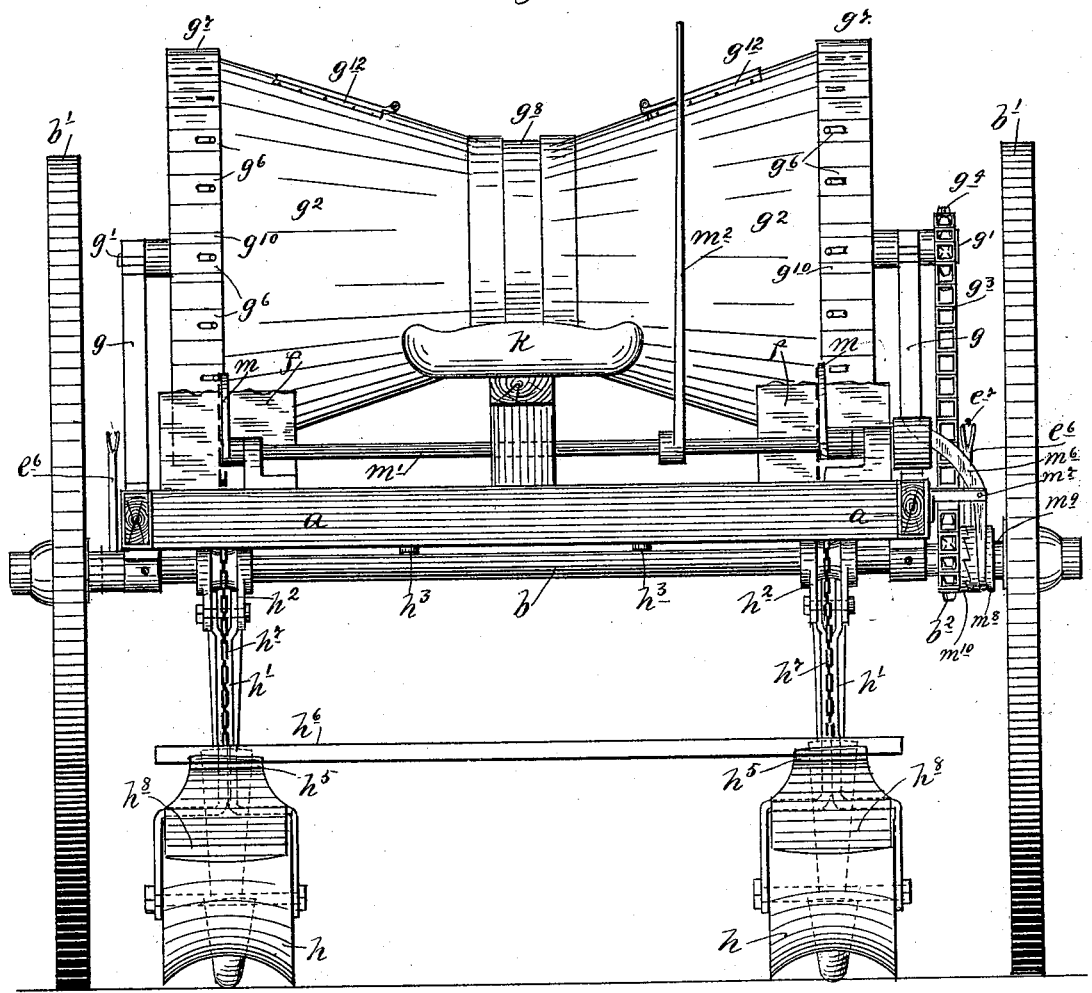

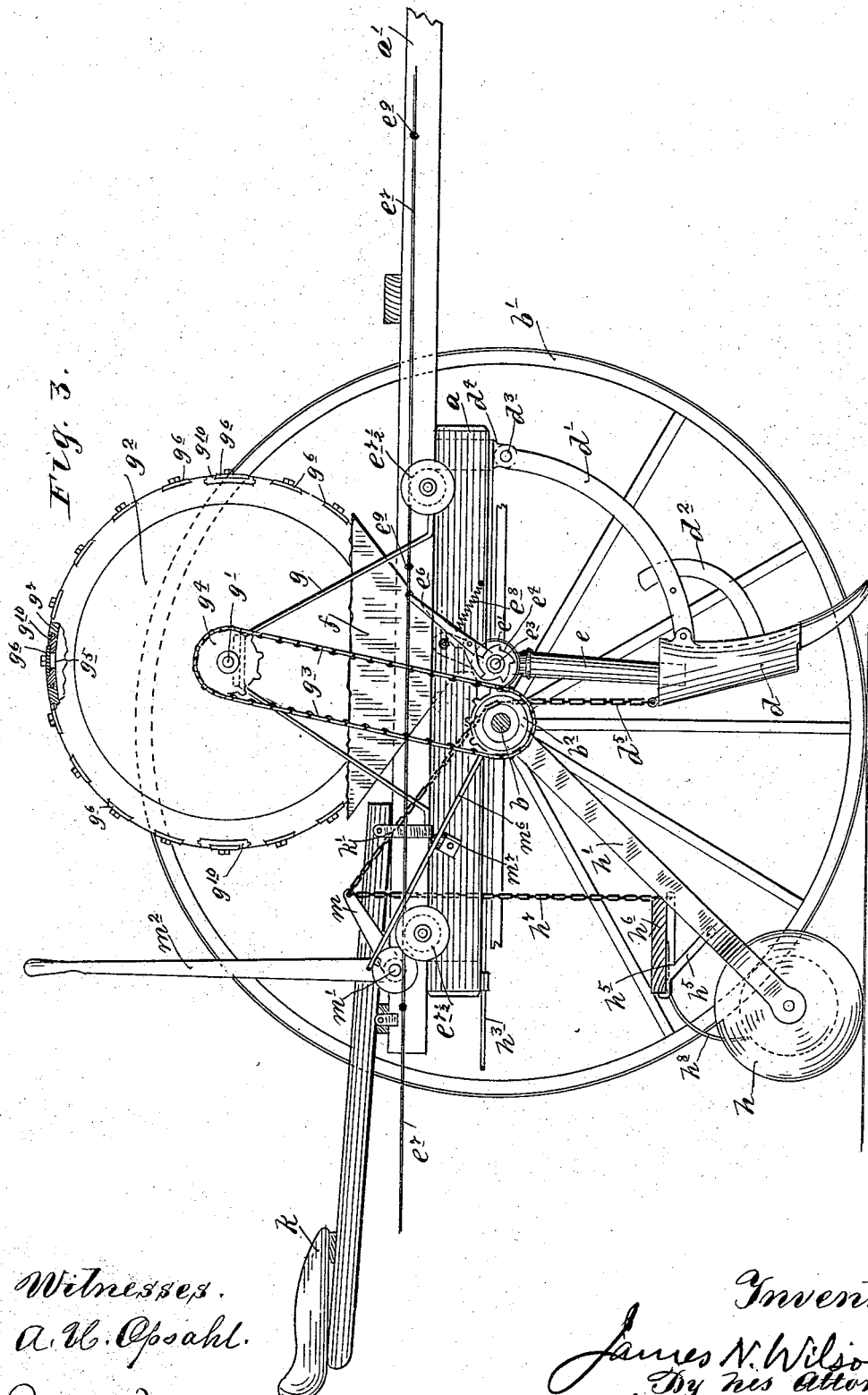

(No Model.) 6 Sheets—Sheet 4.
J. N. WILSON.
PLANTER.
No. 518,979. Patented May 1, 1894.
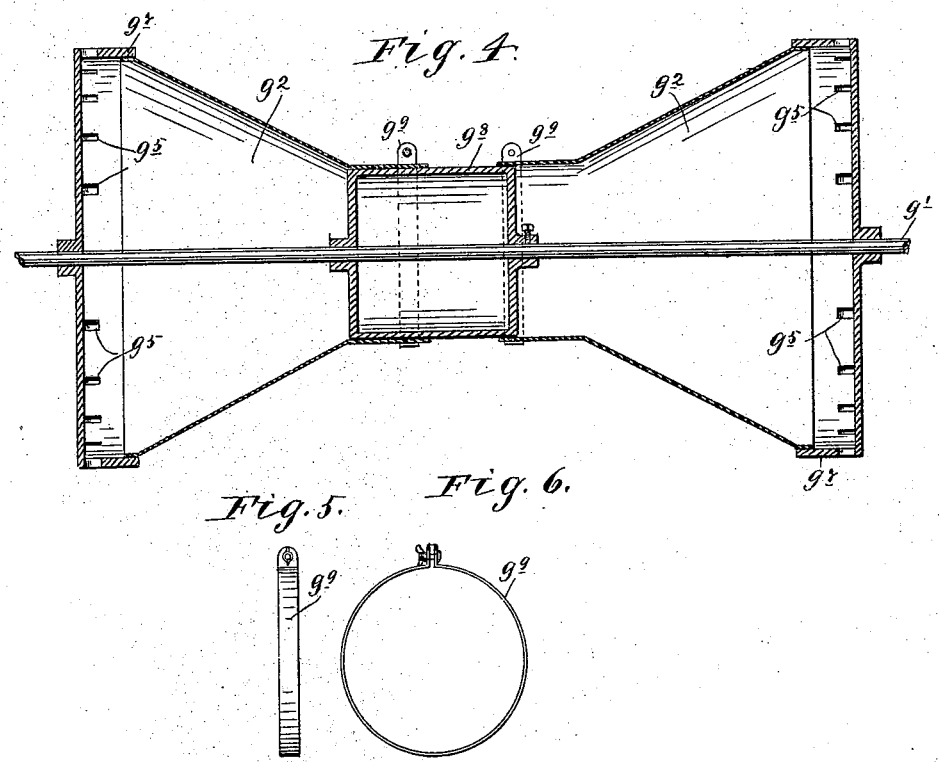

(No Model.) 6 Sheets—Sheet 5.
J. N. WILSON.
PLANTER.
No. 518,979. Patented May 1, 1894.
Fig. 8.
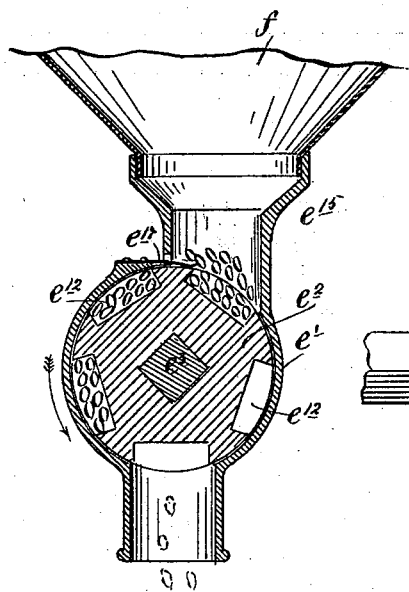
Fig. 7.
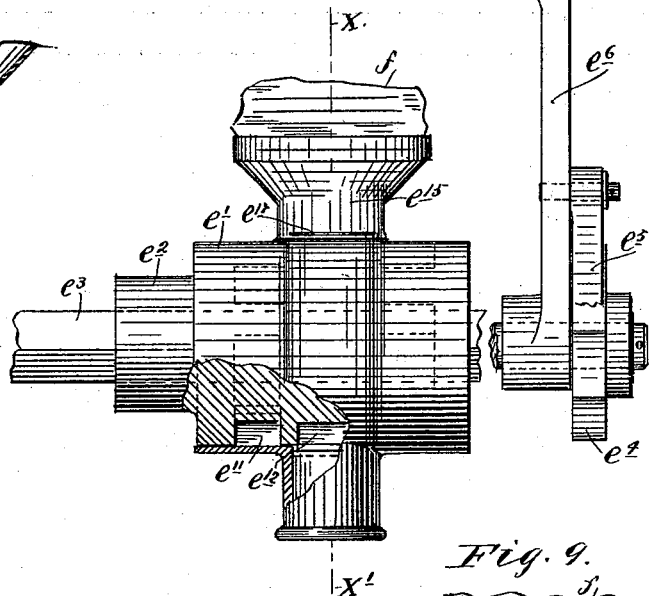
Fig. 11
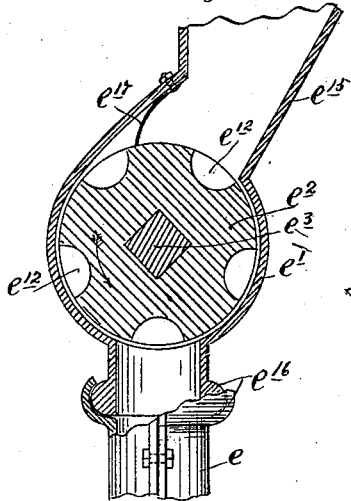
Fig. 10.
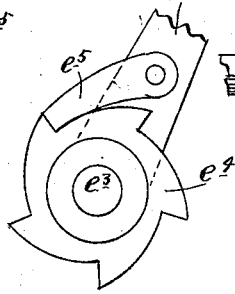
Fig. 9.
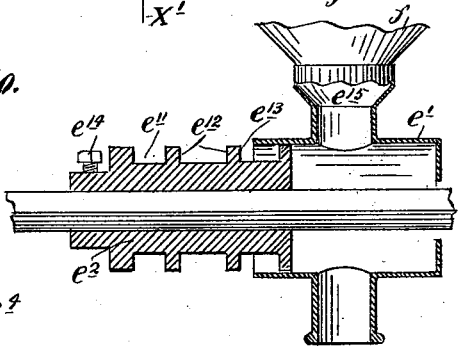
Fig. 9½.
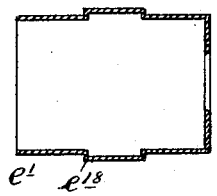
Witnesses
A. H. Opsahl.
Frank D. Merchant.
Inventor.
James N. Wilson
By his Attorney
Jas. P. Williamson
THE NATIONAL LITHOGRAPHING COMPANY,
WASHINGTON, D. C.

(No Model.) 6 Sheets—Sheet 6.
J. N. WILSON.
PLANTER.

No. 518,979. Patented May 1, 1894.

Witnesses.
A. H. Opsahl.
Frank D. Merchant.

Inventor.
James N. Wilson
By his Attorney
Jas. F. Williamson

THE NATIONAL LITHOGRAPHING COMPANY,
WASHINGTON, D. C.

UNITED STATES PATENT OFFICE.

JAMES N. WILSON, OF MINNEAPOLIS, MINNESOTA.

PLANTER.

SPECIFICATION forming part of Letters Patent No. 518,979, dated May 1, 1894.

Application filed April 27, 1893. Serial No. 472,007. (No model.)

*To all whom it may concern:*

Be it known that I, JAMES N. WILSON, a citizen of the United States, residing at Minneapolis, in the county of Hennepin and State of Minnesota, have invented certain new and useful Improvements in Planters; and I do hereby declare the following to be a full, clear, and exact description of the invention, such as will enable others skilled in the art to which it appertains to make and use the same.

My invention relates to planters. The machine is primarily designed for planting cotton, corn and potatoes, but is equally applicable for planting peas, beans and some other kinds of seed, grain, &c. The machine is so constructed that the seed may be planted in drills, bunches or check-rows.

To this end, my invention consists of certain novel devices and combinations of devices, which will be hereinafter fully described and defined in the claims.

My machine is illustrated in the accompanying drawings.

Figure 1:
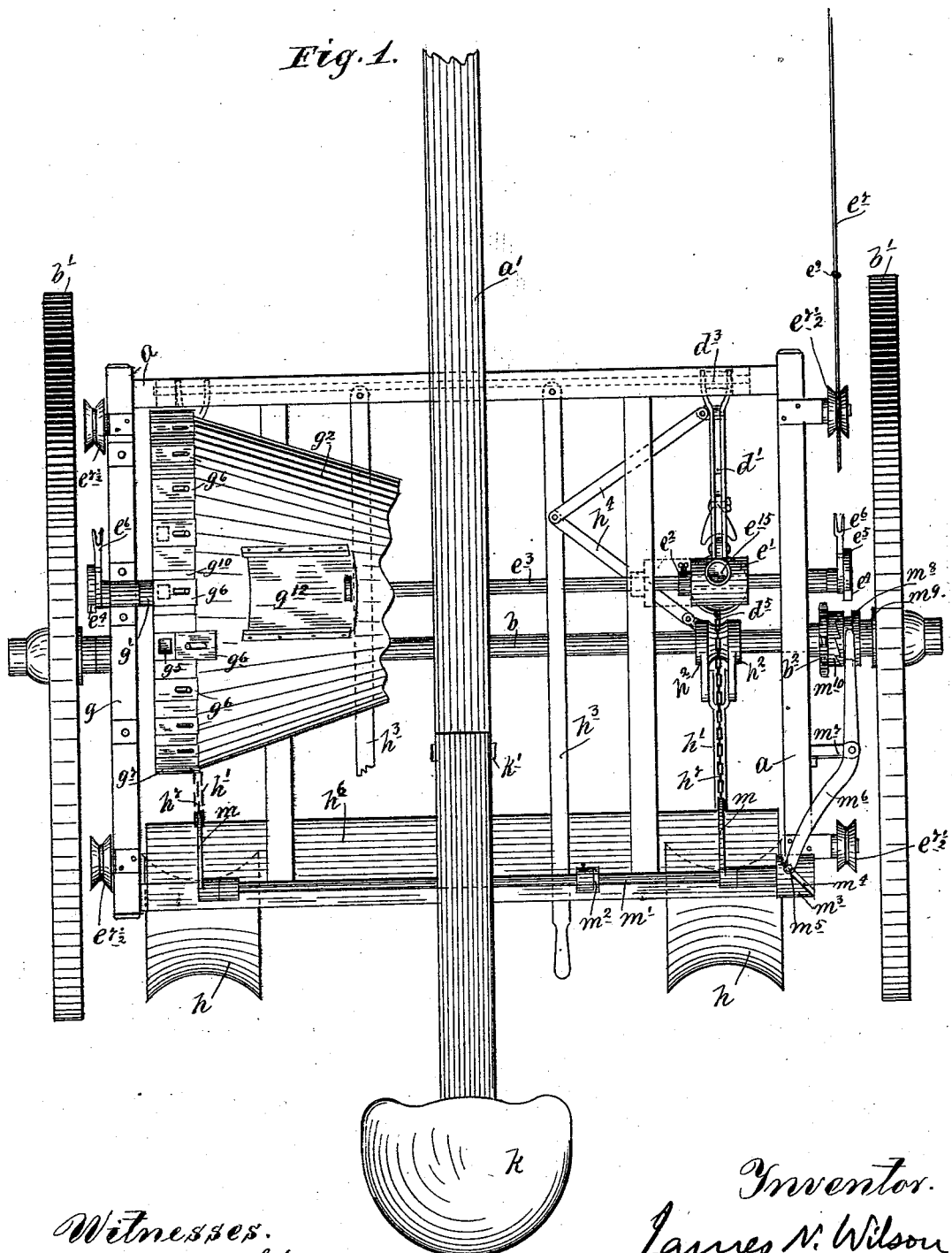
Figure 12:
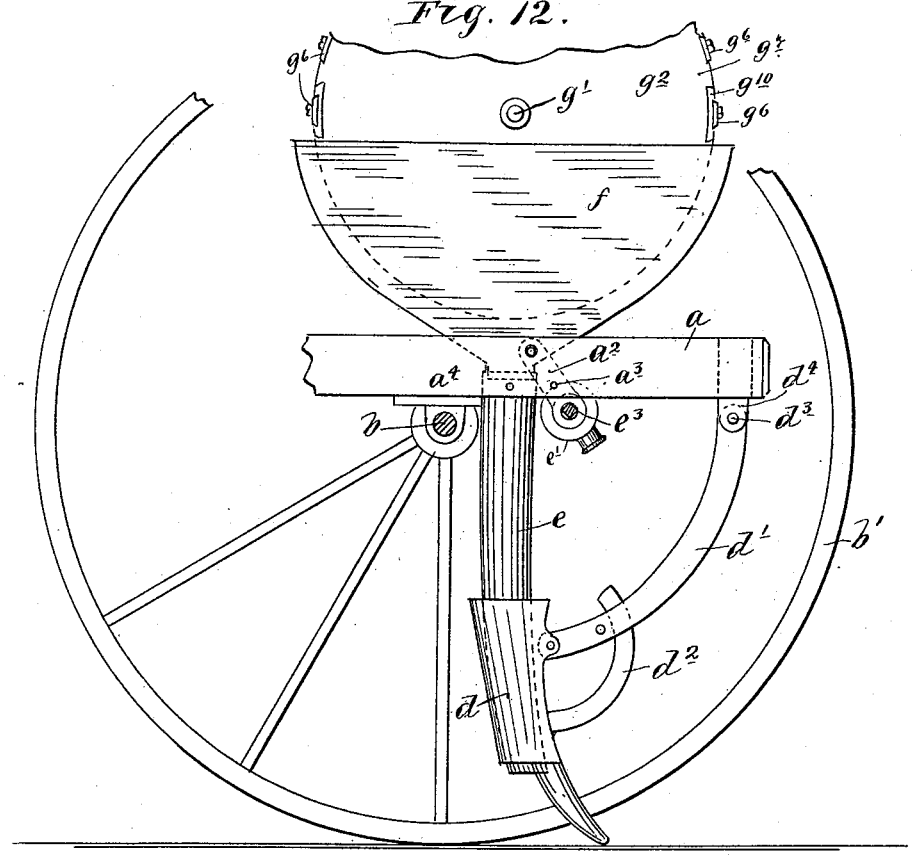
Figure 13:
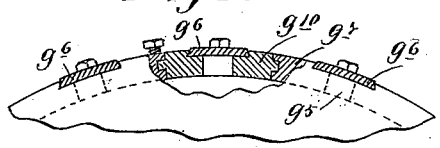
Figure 14:
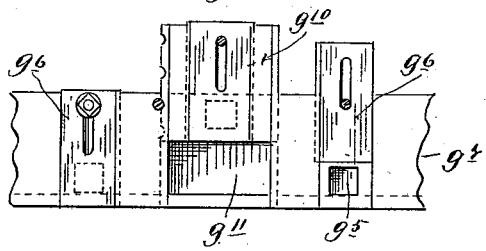

Therein like letters referring to like parts,— Figure 1 is a plan view, with some parts broken away. Fig. 2 is a rear elevation. Fig. 3 is a right side elevation, with some parts broken away. Fig. 4 is a detail, in longitudinal vertical section, of the rotary seed carrying drum. Figs. 5 and 6 are details, in face and edge views, respectively, of a clamping band, used in connection with the sections of the drum, shown in Fig. 4. Fig. 7 is a view, in rear elevation, with some parts broken away, showing the forced feed mechanism, for use when check-rowing. Fig. 8 is a section on the line X X' of Fig. 7. Fig. 9 is a view, in longitudinal section, through the feed-roll and case on a vertical line, with the feed-roller adjusted into its inoperative position; and Fig. 9½ a section of the casing detached. Fig. 10 is a detail in diagram, showing the ratchet and pawl, for operating the feed-shaft. Fig. 11 is a view, similar to Fig. 8, showing a slightly modified construction. Fig. 12 is a view, in right side elevation, showing the parts as adjusted, when in use for planting potatoes. Figs. 13 and 14 are details, in end and plan view, respectively, showing the double slides in the rotary drum, for adapting the same to planting potatoes.

A suitable main-frame $a$, preferably of skeleton rectangular form, and having a tongue $a'$, is pivotally mounted in the usual way, on the axle $b$ of the supporting or ground wheel $b'$. To the forward cross-bar of the frame $a$, near its opposite corners, are pivotally attached a pair of seed-boots or furrow openers $d$, by hanger-arms $d'$, the angle of which boots may be fixed in the usual way, by segmental braces $d^2$, secured to the hangers $d'$. Corresponding seed-hose or seed-pipes $e$, work in the seed-boots and depend from a pair of feed-roll cases $e'$, inclosing celled adjustable feed-rolls $e^2$ mounted for a sliding movement on a rectangular feed-shaft $e^3$, journaled in hangers $a^2$ from the main-frame $a$. This feed-shaft $e^3$ is provided, on its opposite ends, with a ratchet-wheel $e^4$, which is engaged by a pawl $e^5$ pivoted to a trip-lever $e^6$, which is loosely pivoted on the shaft $e^3$ and co-operates with check-rowing wire $e^7$, to operate the rollers $e^2$, at the proper times, for delivering the seed in check rows. The lever $e^6$ is normally held in its extreme forward position, by a spring $e^8$ and is thrown backward to operate the ratchet-wheel $e^4$, shaft $e^3$ and roller $e^2$, by knobs or enlargements $e^9$, located at the proper intervals on the wire $e^7$. The wire is held up by guide rollers $e^{7\,1\text{-}2}$. The free end of the lever $e^6$ is forked, to provide an open ended crotch $e^{10}$, for engagement with the wire, while permitting the wire to be readily thrown out therefrom, as required, when turning the machine around. The double set of levers $e^6$ are to permit the co-operation with the wire $e^7$ from either side of the machine. This check rowing mechanism, so far as the wire $e^7$ and the pawl-lever and ratchet, for operating the forced feed, is concerned, are well-known operative constructions and need no further explanation.

The feed-rollers $e^2$ are provided with a series of circularly arranged cells $e^{11}$, $e^{12}$ and $e^{13}$, of different sizes, for adaptation to different sizes or kinds of seed; and the roller is adjustable, longitudinally of the shaft $e^3$, and is securable in any desired position thereon, by set-screws $e^{14}$. Hence, the rollers $e^2$ may be adjusted, so as to bring any one of the series of cells in proper position for use, or so as to throw the roller entirely to one side of the passage way, through the casing $e'$.

The casings $e'$ have, on their upper surfaces, mouths $e^{15}$, engaging with the lower ends of and receiving from hopper-shaped intermediate feed-spouts or receivers $f$, which are secured in any suitable way in their proper working positions, and serve a special function, for handling cotton seed, as will hereinafter appear.

In bearing brackets $g$, rising from the side-bars of the main frame $a$, is journaled a cross shaft $g'$, which carries a bi-coniform drum $g^2$, arranged large ends outward, which serves as the main reservoir or receptacle, for the materials to be planted. A rotary motion is given to the drum $g^2$, from the main axle $b$ through a sprocket-chain $g^3$, passing over the sprocket $b^2$ on the main-axle and the sprocket $g^4$ on the end of the drum shaft $g'$.

The drum $g^2$ is constructed, as shown, in the form of two frustums of cones, arranged on the shaft $g'$ with their large ends outward, and having their outer margins directly over and rotating in the intermediate hoppers $f$. This bi-coniform construction adapts the drum, under its rotary motion, to force the seed or other materials to the outer margins of the drum. At these outer margins, the drum is provided with a series of discharge openings $g^5$, controlled by slides $g^6$; which slides are mounted for independent adjustment in cylindrical rims $g^7$. These rims $g^7$ are preferably made of cast-iron, to give the necessary rigidity, and are made of cylindrical, rather than of conical form, for convenience in casting, the rims and heads of the drum being cast in single pieces, while the bodies or conical parts of the drum are made of sheet metal. The two sections or frustums of the drum are preferably made adjustable toward and from each other on the common supporting shaft $g'$, in order to adapt the drum for different widths of row-spaces. As a convenient means, for supporting the inner ends of the drum sections, and permitting the said adjustment, a central rigid support $g^8$ is fixed to the shaft $g'$, on which the inner ends of the drum sections slide. The drum sections are held in whatever position they may be set on the said support $g^8$, by clamping bands $g^9$.

Certain of the slides $g^6$ covering the ordinary discharge openings $g^5$, are seated in larger slides $g^{10}$, seated in the rims $g^7$ which may be pulled out at will, as shown in Fig. 14, to give large sized openings $g^{11}$, such as are required when using the machine for planting potatoes.

Suitable covering devices $h$ are mounted in hangers $h'$, which are pivoted at their upper ends to collars $h^2$ loose on the axle $b$. These covering devices are of course, in line with the seed-boots $d$, and both the seed-boots and the covering devices have a limited lateral adjustment, for adapting the same to different widths of row spaces, which lateral adjustment is effected by the horizontal lever $h^3$, and the pair of links $h^4$, one of which is attached to the seed-boot hanger, and the other to the collar $h^2$, which carries the covering device hanger. It is not necessary to adjust the forced feed casing $e$ laterally, for the reason that the hose or pipes $e$ will swing laterally sufficient to give the necessary range to the seed-boot. The seed-boot hangers $d'$, are connected to the frame $a$, through a cross rod $d^3$ and eye-bearings $d^4$, which permits said lateral adjustment.

The covering devices $h$ are shown, as in the form of concave metallic rollers; but of course, may be of any other suitable form.

The covering device drag-bars or hangers $h'$ are provided with rearwardly projecting brackets $h^5$, on which loosely rest a foot-board $h^6$.

Scrapers $h^8$ keep the rollers $h$ clean.

A seat $k$ is provided for the driver, which is supported from and longitudinally adjustable on the rearwardly extended part of the tongue-bar $a'$. As shown, the connection between the seat-bar $k$ and the tongue $a'$, is by means of a stirrup $k'$, secured to the seat-bar $k$ and embracing the tongue-bar $a'$. A sliding-block $k^2$ is also provided, which serves to adjust the seat in point of height. The driver on this seat is in position to reach the foot-board $h^6$ with his feet and apply pressure thereto, whenever necessary.

The seed-boots $d$ and the covering device drag-bars $h'$ are connected by chains $d^5$ and $h^7$ respectively, to the arms $m$ of a rock-shaft $m'$, provided with a hand-lever $m^2$ within reach of the driver on the seat $k$, for raising the same, whenever so desired. The rock-shaft $m'$ has on its right end a cam-block $m^3$, with a cam-groove $m^4$, engaged by a pin or roller $m^5$ of a clutch shipper-fork $m^6$, pivoted to a bracket-arm $m^7$ and operating the sliding member $m^8$, of a clutch, the other member $m^{10}$ of which is formed on the hub of the sprocket $b^2$. The sprocket $b^2$ is loose on the axle $b$; and the axle is held from rotary movement in the frame $a$, the supporting or ground wheels $b'$ turning on the axle. The sliding half clutch $m^8$ is carried on an inwardly projecting sleeve $m^9$ from the hub of the right wheel $b'$. With this construction, whenever the seed-boots and covering devices are in their lowermost position, the clutch-members will be engaged and the drum $g^2$ be revolved; while, when the said seed-boots and covering devices are raised by throwing backward the hand-lever $m^2$, the sprocket $b^2$ will be set free from the sliding clutch $m^8$, throwing the drum $g^2$ out of gear.

The drum-sections are provided with sliding doors $g^{12}$, for the admission of the materials to be planted.

The forced feed shaft $e^3$ and the forced feed devices carried thereby, are journaled in hanger-arms $a^2$, as hitherto stated, which fact permits the same to be thrown forward into an idle position, such as shown in Fig. 12, when it is not desired to use the check-rowing or forced feed devices. The hangers $a^2$ are secured in their idle and operative positions, by pins $a^3$, engaging holes $a^4$ in the side bars of the frame. When the forced feed devices are thus thrown into an inoperative position, the hose or pipes $e$, may be applied directly to the lower ends of the intermediate hoppers $f$, giving the direct delivery required for the discharge of large materials like potatoes. If the tubes or pipes $e$ be made of metal, they should connect with the casings $e'$, or with the feed-hoppers $f$ when applied thereto, in such a way as to permit the same an angular adjustment. This might be done, for example, by a ball and socket-joint, as shown at $e^{16}$ in Fig. 11. In this event, the tubes would be constructed in two sections, and secured together by bolts, as shown at $e^{17}$. The tubes $e$ must either be made of a size large enough to pass potatoes; or a substitute set of the said tubes $e$ of larger size be applied for the purpose.

The feed-roller $e^2$ is swept by a spring cut-off $e^{17}$, as shown in Figs. 8 and 11, the form shown in Fig. 11, being the preferable construction.

The operation of the machine may now be understood. Suppose the machine to be in use for planting corn, cotton, peas, beans, or similar materials in check-rows. The parts would then be in the position shown in Figs. 1, 2, 3, 7, 8 and 11. One or more of the discharge openings $g^5$ would be uncovered by the slides $g^6$, for permitting the drum under its rotary motion, to supply the seed in limited but sufficient quantities to the intermediate feed-hoppers $f$. Under the forward motion of the machine, the forced feed will then be operated, at the proper intervals, causing the feed-rollers $e^2$ to discharge the seed in the proper quantities into the tubes $e$; whence, it will drop by gravity, of course, into the troughs opened by the seed-boots $d$, and be covered by the covering rollers $h$. It is assumed of course, that the feed-rollers $e^2$ have been adjusted in their casings $e'$, to bring the circle of cells $e^{11}$, $e^{12}$, &c., of the proper size, into action, according to the character of the seed or the number of kernels it is desired to plant in a place. The intermediate hoppers $f$ serve a very important function for seeding cotton, and similar light materials. As is well-known, cotton seeds are light and are covered with a fibrous fuzz or nap, which makes the same very difficult to handle with a forced feed. If the feed-hopper, in which the forced feed works, be filled with the seed, it will inevitably choke and lodge in the hopper and fail to fall into the forced feed device. The intermediate hoppers $f$ overcome this difficulty, when taken in connection with the primary or main receptacle shown in this case, as in the form of the drum $g^2$. In other words, by dividing the feed into two steps, from the primary or main reservoir, I am able to relieve the feed-hopper, to the forced feed device, from the load in the primary reservoir, and thereby prevent the clogging, which would otherwise occur. The seed as supplied, to the intermediate hoppers $f$, give such a small quantity therein, that the same will not lodge, but will readily fall into the cells of the feed-rollers $e^2$. The openings $g^5$ from the outer ends of the drum $g^2$, may be made sufficient in number, and the openings graduated by the slides $g^6$, so as to supply the seed in any desired quantities. If it is found desirable, as will probably be the case, to arrange these openings $g^5$, for slightly excessive supply to the hoppers $f$, provision can readily be made for throwing the drum $g^2$ out of gear, at suitable intervals, so as to avoid undue accumulation in the hoppers $f$.

If instead of check-rowing the seed, it is desired to drill or drop the same in bunches, it is only necessary to shift the feed-rollers $e^2$ into the position shown in Fig. 9. A clear passage-way will then be given through the casings $e'$. More or less of the openings $g^5$ will then be uncovered, and to the proper extent, to deliver the seeds from the drum $g^2$, at the proper intervals and in the proper quantities.

If it is desired to use the machine for planting potatoes, the feed-shaft $e^3$ and all its connected parts are swung into their idle position, as shown in Fig. 12, and the tubes $e$ are applied directly to the lower ends of the hoppers $f$. The large slides $g^{10}$ in the drum rims $g^7$, are thrown outward, so as to expose or afford the large openings $g^{11}$. The potatoes will be then discharged by the drum at the proper intervals through the said openings $g^{11}$, in the same way that the corn, cotton, or other seed had been dropped through the smaller openings $g^5$. In the drum $g^2$, as shown, there are four of the large slides $g^{10}$, each containing a smaller slide $g^6$. Hence, one or more of the large slides $g^{10}$ may be thrown into their open position, according as it is desired to space the potatoes in the rows, as for drilling or bunching, at will.

It should be noted that the lateral adjustment of the seed-boots and covering devices might of itself suffice for adapting the machine to different widths of row spaces, without the adjustment of the drum-sections, supposing that the tubes $e$ are either flexible, or angularly adjustable.

Regarding the action of the feed-rollers $e^2$, the form of mouth $e^{15}$, shown in Fig. 11, is by far the most efficient, in combination with the spring-scraper or brush $e^{17}$ therein shown. It should also be noted, that the casings $e'$ are outwardly enlarged or provided with annular bulges $e^{18}$, in line with the cells of the feed-roller $e^2$, when in working position, for the purpose of affording the necessary clearance for the proper action of the said cells. Otherwise, the seeds would be broken or would lodge and interfere with the proper action of the roller, between the roller and the casing. It may also be noted, that instead of laterally adjusting the feed rollers $e^2$, into the position shown in Fig. 9, for drilling or bunching, the shaft $e^3$ and all the forced feed devices may be swung into the position shown in Fig 12. The check rowing trip lever $e^6$ and wire $e^7$ have been shown as arranged for work above the axle $b$; but, of course, they might equally well be arranged to work from below by properly locating the guide rollers $e^{7\,1\text{-}2}$, which would, in some respects, be the preferred arrangement.

It will be understood, that many variations might be made in the construction and arrangement of the parts, without departing from the spirit of my invention.

What I claim, and desire to secure by Letters Patent of the United States, is as follows:

1. In a planter, a revoluble seed-drum constructed in two parts, each having marginal discharge openings, said parts being adjustable with reference to each other, for adapting the machine for different widths of row space, substantially as described.

2. In a planter, a seed receptacle, consisting of a pair of cone frustums with discharge openings, arranged large ends outward facing opposite sides of the machine, and at least one of which is longitudinally adjustable for adapting the machine for different widths of row spaces, substantially as described.

3. In a planter, the combination with a rotary shaft and a central drum support of a biconiform seed drum, consisting of a pair of cone frustums, supported from said shaft and support, arranged large ends outward and adjustable toward and from each other on said shaft and support, substantially as and for the purpose set forth.

4. The combination with the shaft $g'$, of the central support $g^8$, the conical drum sections $g^2$, supported adjustably with their small ends on said support and the heads of their large ends on said shaft, and the clamping bands $g^9$, for holding the drum sections wherever set, substantially as described.

5. In a planter, a rotary seed drum having a series of discharge openings covered by a corresponding series of slides certain of which slides are double, consisting of a relatively large and a relatively small member, for adapting the machine to either small or large materials, such as corn, cotton and potatoes, substantially as described.

6. In a planter, the combination with a main seed receptacle or reservoir and a graduated forced feed mechanism, of an intermediate feed hopper or transmitter receiving from said main reservoir in small quantities and delivering to said forced feed device, whereby cotton and similar seeds can be successfully delivered with a graduated feed.

7. In a planter, the combination with the biconiform rotary seed drum, arranged large ends outward and provided with marginal discharge openings, of a graduated forced feed mechanism, the intermediate hoppers or transmitters receiving from said seed drum and delivering to said hoppers and the check rower mechanism, substantially as described.

8. A graduated forced feed for planters comprising a celled feed roller and a casing for the same having an annular internal groove in line with the cells of said roller, when in operative position, whereby clearance is afforded for the loaded cells, substantially as described.

9. The combination with the feed roller casing, having a seed receiving mouth and discharge passage and provided with an annular interior groove, of the celled feed roller closely fitting said casing with its operative cells in line with said groove and a spring sweep or scraper in the feed mouth of the casing and working on the periphery of said roller, substantially as described.

10. In a planter, the combination with the biconiform rotary seed drum, having marginal discharge openings at its large or outer ends, angularly yieldingly seed tubes, corresponding pairs of seed boots and covering devices, at least one set of which are laterally adjustable for adapting the machine to different widths of row spaces, substantially as described.

11. In a planter, the combination with the rotary biconiform seed drum constructed in two sections adjustable toward and from each other, of the laterally adjustable seed-boots and covers, cooperating therewith to adapt the machine to different widths of row spaces, substantially as described.

12. In a planter, the combination with the rotary seed drum and the intermediate hopper, of the forced feed mechanism, adjustable away from said hoppers, for permitting a direct delivery from said drum, substantially as described.

13. In a double row planter, the combination with the pairs of seed boots and covering devices, of the rider's seat projecting rearward from the main frame and the loose footboard within reach from the said seat, whereby the driver may, by resting more or less of his weight on said foot-board, vary the packing action of said covering devices.

In testimony whereof I affix my signature in presence of two witnesses.

JAMES N. WILSON.

Witnesses:
JAS. F. WILLIAMSON,
FRANK D. MERCHANT.